(12) United States Patent
Eden (10) Patent No.: US 9,248,903 B2
(45) Date of Patent: Feb. 2, 2016

(54) AIRCRAFT ASSEMBLY AND SPAR

(75) Inventor: James Eden, Bristol (GB)

(73) Assignee: Airbus Operations Limited, Bristol (GB)

( * ) Notice: Subject to any disclaimer, the term of this patent is extended or adjusted under 35 U.S.C. 154(b) by 588 days.

(21) Appl. No.: 13/138,706

(22) PCT Filed: Apr. 15, 2010

(86) PCT No.: PCT/GB2010/050620
§ 371 (c)(1),
(2), (4) Date: Sep. 21, 2011

(87) PCT Pub. No.: WO2010/122324
PCT Pub. Date: Oct. 28, 2010

(65) Prior Publication Data
US 2012/0012712 A1    Jan. 19, 2012

(30) Foreign Application Priority Data

Apr. 23, 2009 (GB) .................................. 0906952.7

(51) Int. Cl.
*B64C 9/00* (2006.01)
*B64C 9/22* (2006.01)
*B64C 3/28* (2006.01)

(52) U.S. Cl.
CPC ... *B64C 9/22* (2013.01); *B64C 3/28* (2013.01); *Y02T 50/433* (2013.01); *Y02T 50/44* (2013.01)

(58) Field of Classification Search
CPC ............ B29C 70/30; B64C 3/18; B64C 3/28; B64C 9/00; Y02T 50/433
USPC ....... 244/210–217, 123.1, 131, 129.1, 117 R, 244/201
See application file for complete search history.

(56) References Cited

U.S. PATENT DOCUMENTS 1,917,428 A * 7/1933 Burnelli ......................... 244/214
2,322,104 A * 6/1943 Arcier et al. .............. 244/135 R
(Continued)

FOREIGN PATENT DOCUMENTS

EP    0 291 328    11/1988
EP    0 501 831    9/1992
(Continued)

OTHER PUBLICATIONS

UK Search Report dated Aug. 20, 2009 for GB 0906952.7.
(Continued)

*Primary Examiner* — Tien Dinh
*Assistant Examiner* — Assres H Woldemaryam
(74) *Attorney, Agent, or Firm* — Nixon & Vanderhye P.C.

(57) ABSTRACT

An aircraft assembly comprising: a pair of covers; a spar web extending between the covers in a thickness direction, the spar web having a length which extends in a span-wise direction; and a container which extends from the spar web and houses at least part of a system component. The container comprises first and second side walls which are spaced apart from each other across the spar web in the thickness direction, and inboard and outboard walls which are spaced apart from each other along the spar web in the span-wise direction. The spar web and at least part of the container are integrally formed as a single piece. Typically the assembly is a wing assembly with a fuel tank; a track; a high-lift device carried by the track; an actuation mechanism for moving the track and high-lift device between an extended high-lift position and a retracted low-lift position; and a track container which extends from the spar web into the fuel tank and houses at least part of the track when it is in its retracted low-lift position. The spar web and at least part of the track container are integrally formed as a single piece, typically from a laminar composite material.

16 Claims, 7 Drawing Sheets

(56) References Cited

U.S. PATENT DOCUMENTS

| | | | | |
|---|---|---|---|---|
| 2,779,702 | A | * | 1/1957 | Wilson et al. .................. 220/562 |
| 4,399,970 | A | * | 8/1983 | Evans ............................ 244/214 |
| 4,471,928 | A | * | 9/1984 | Cole .............................. 244/215 |
| 4,475,702 | A | * | 10/1984 | Cole .............................. 244/214 |
| 4,838,503 | A | * | 6/1989 | Williams ....................... 244/214 |
| 5,152,949 | A | | 10/1992 | Leoni et al. |
| 5,222,653 | A | * | 6/1993 | Joyce et al. ................. 228/173.6 |
| 5,544,847 | A | * | 8/1996 | Bliesner ........................ 244/214 |
| 5,639,535 | A | * | 6/1997 | McCarville .................... 428/119 |
| 6,149,105 | A | * | 11/2000 | Jaggard .......................... 244/214 |
| 7,578,484 | B2 | * | 8/2009 | Fox et al. ....................... 244/214 |
| 8,025,257 | B2 | * | 9/2011 | Gyuricsko et al. ............. 244/214 |
| 8,181,913 | B2 | * | 5/2012 | Jaggard et al. ................. 244/214 |
| 8,387,924 | B2 | * | 3/2013 | Gyuricsko et al. ............. 244/214 |
| 2009/0001630 | A1 | * | 1/2009 | Astwood et al. ............... 264/231 |
| 2009/0218450 | A1 | * | 9/2009 | McAlinden et al. ........ 244/90 R |
| 2010/0258674 | A1 | * | 10/2010 | Sutton et al. ............... 244/123.1 |

FOREIGN PATENT DOCUMENTS

| | | |
|---|---|---|
| EP | 1 425 215 | 3/2003 |
| GB | 1 461 792 | 1/1977 |
| GB | 2 304 656 | 3/1997 |
| JP | 4-294113 | 10/1992 |
| JP | 2008-544886 | 12/2008 |
| WO | WO 03/022677 | 3/2003 |
| WO | WO 2007/003011 | 1/2007 |

OTHER PUBLICATIONS

International Search Report and Written Opinion of the International Searching Authority mailed Feb. 17, 2011 for PCT/GB2010/050620.

M.C.Y. Niu, "Composite Airframe Structures—Practical Design Information and Data" 1992, pp. 234-235.

Japanese Office Action dated Jan. 7, 2014 and English Summary.

* cited by examiner

AIRCRAFT ASSEMBLY AND SPAR

This application is the U.S. national phase of International Application No. PCT/GB2010/050620 filed 15 Apr. 2010 which designated the U.S. and claims priority to GB 0906952.7 filed 23 Apr. 2009, the entire contents of each of which are hereby incorporated by reference.

FIELD OF THE INVENTION

The present invention relates to an aircraft assembly comprising: a pair of covers; a spar web extending between the covers; and a container which extends from the spar web and houses at least part of a system component. The invention also relates to a spar suitable for use in such an assembly. The system component may comprise a track for a high-lift device such as a slat.

BACKGROUND OF THE INVENTION

In order to provide aircraft operators with sufficient high lift performance in critical stages of a flight, aircraft wings have been designed to have deployable and retractable slats along the leading edge. This has historically been achieved by mounting the slats on pairs of curved slat tracks, which are driven from their respective stowed and extended positions by a rack and pinion mechanism. Aircraft wings are used to store the fuel required for the flight and as such maximising the volume available for the fuel is important. For this reason the front spar is generally positioned as far forward as possible, leaving minimal space within the wing leading edge to house the various systems and devices which must reside there.

These are two conflicting requirements: a large leading-edge area to house moveable devices and a large fuel volume. The resulting solution has been to allow the slat tracks to penetrate the front spar (fuel boundary) by adding cylindrical track cans which are attached to the rear of the front spar for the tracks to extend into when in the stowed (retracted) position. It is therefore critical to note that for this reason the track cans are also part of the fuel boundary wing box structure.

Figure 1:
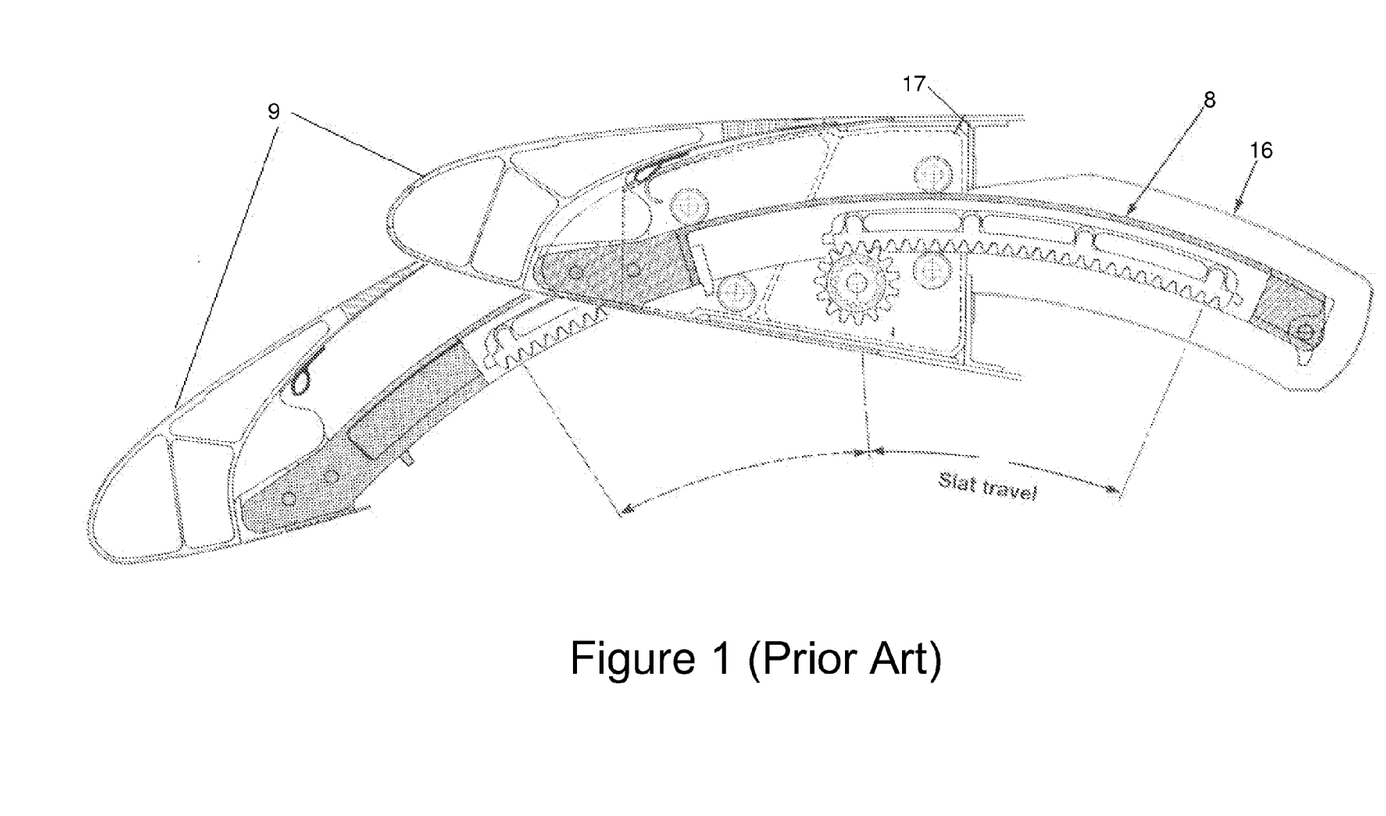
FIG. 1 is a sectional side view of the leading edge of a conventional aircraft wing assembly.

A typical aircraft wing assembly incorporating such a track can is shown in FIG. 1. The wing has a relatively long slat track 8 carrying a slat 9 which is driven by a pinion gear along a curved path defined by a set of rollers between a retracted low-lift cruise position, an intermediate take-off and climb position, and a fully extended high-lift landing position. FIG. 1 shows the slat in both extreme ends of its movement. As the slat track 8 moves, it slides in and out of a slat track can 16 which is attached to the rear face of the web of the front spar 17.

Track cans are traditionally fabricated as a welded aluminium assembly, which is a notoriously expensive manual process requiring skilled personnel a long time to fabricate. This combination invariably results in a high level of scrap and hence greater expense.

Track cans also present significant problems from a mounting point of view. Integral to the welded construction is a flange at the base of the track can with captive nuts used for attachment to the spar. Each track can (of which there are often more than twelve on each wing) must be fitted and sealed to preserve fuel integrity. This is time consuming and subject to leakage, resulting in greater expense.

Further to these problems are the issues which arise when track cans are used within composite wing box construction. The inherent differences between the mechanical properties of composites when compared to metals results in a reduction in 'flat' spar web area, for a given outer wing profile, to which a track can is able to be mounted. To compound this problem further is the shift towards shallower wing boxes i.e. shallower spar webs. Combining these two problems results in conflicts between track cans and other wing box components.

Similar problems exist in relation to other system components which are normally housed in the leading or trailing edge of an aircraft wing: for instance transformers for an electrical de-icing system, or actuator units for driving a slat deployment mechanism. As with a slat track it would also be desirable to house such components on the "fuel" side of the spar web in order to free up space within the leading or trailing edge.

Although the above discussion has focused on the aircraft wing, similar problems also exist in relation to other aerodynamic parts of the aircraft such as the vertical tail plane and horizontal tail plane.

A so-called "Sine-Wave Spar" is described in "Composite Airframe Structures—Practical Design Information and Data", Page 234, Michael C. Y. Niu, ISBN 962-7128-06-6, Published 1992. The spar web is formed with sinusoidal corrugations which extend from the spar web at a relatively shallow angle.

SUMMARY OF THE INVENTION

A first aspect of the invention provides an aircraft assembly comprising: a pair of covers; a spar web extending between the covers in a thickness direction, the spar web having a length which extends in a span-wise direction; and a container which extends from the spar web and houses at least part of a system component, wherein the container comprises first and second side walls which are spaced apart from each other across the spar web in the thickness direction, and inboard and outboard walls which are spaced apart from each other along the spar web in the span-wise direction, and wherein the spar web and at least part of the container are integrally formed as a single piece.

A further aspect of the invention provides a method of manufacturing an aircraft spar assembly, the method comprising laying up a stack of plies of composite material; moulding the stack of plies by a combination of heat and pressure to form a spar with a spar web and at least part of a container; curing the spar in its moulded shape; and housing at least part of a system component in the container.

Integrally forming the spar web and at least part of the container as a single piece enables the spar web to be relatively shallow because it is no longer necessary to provide relatively flat sections of spar web around the container to accommodate a flange at the base of the container.

The spar web and at least part of the container may be integrally formed from metal, but more preferably they are integrally formed from a laminar composite material such as fibre-reinforced epoxy resin. In this case then typically at least one ply of the laminar composite material extends continuously from the spar web and into the container.

The spar web and at least part of the container may be integrally formed as a single piece by moulding, milling, additive layer fabrication, or any other suitable method.

The inboard and outboard walls may be integrally formed as a single piece with the spar web; and at least part of the system component housed between the inboard and outboard walls. Similarly, the first and second side walls may be integrally formed as a single piece with the spar web; and at least part of the system component housed between the side walls.

Typically the spar further comprises a first spar cap which is integrally formed as a single piece with the spar web and joined to a first one of the covers; and a second spar cap which is integrally formed as a single piece with the spar web and joined to a second one of the covers. In one embodiment the inboard and outboard walls extend fully between the spar caps, so the spar caps form the first and second side walls of the container.

The container may comprise an end wall which is integrally formed as a single piece with the spar web. In this case then typically the end wall is integrally formed as a single piece with the inboard and outboard walls, and/or the side walls. Alternatively the container may comprise a container flange which extends from the spar web and is integrally formed as a single piece with the spar web; and a container body which is joined to the container flange by bonding, bolting or any other suitable means.

The assembly typically forms part of an aerodynamic aircraft part with a leading edge and a trailing edge—such as a vertical tail plane (VTP), a horizontal tail plane (HTP), or a wing. In the case of a wing then the container extends from the spar web into a fuel tank. In the case of a wing or HTP, then the thickness direction is approximately vertical, whereas in the case of a VTP then the thickness direction is approximately horizontal.

The system component may comprise a transformer for an electrical de-icing system; an electric or hydraulic actuator unit; a track carrying a high-lift device; or any other suitable system component. In the case where the system component is a track, then the assembly further comprises a high-lift device carried by the track; and an actuation mechanism for moving the system component and high-lift device between an extended high-lift position and a retracted low-lift position, wherein the container houses at least part of the track when it is in its retracted low-lift position.

A further aspect of the invention provides a spar for an aircraft, the spar comprising a spar web and a container, wherein the spar web and at least part of the container are integrally formed as a single piece, the spar web has a length which extends in a span-wise direction, the track container comprises inboard and outboard walls which are spaced apart along the length of the spar web in the span-wise direction and extend at an angle from the spar web, and the angle is between 50° and 130°. Typically the angle is between 70° and 110° and most preferably the angle is between 80° and 100°.

In contrast to the spar described in: "Sine-Wave Spar", "Composite Airframe Structures—Practical Design Information and Data", Page 234, Michael C. Y. Niu, ISBN 962-7128-06-6, Published 1992, the inboard and outboard walls of the container extend from the spar web at a relatively steep angle. This makes the container more suitable for housing a system component as in the first aspect of the invention.

The walls may be approximately planar, although they may be slightly curved. In the case where the walls are curved then preferably a majority of the depth of the container has inboard and outboard walls which fall extend steeply from the spar web within the range of angles described above.

The spar may consist of a web only (without spar caps), or it may be formed integrally with another part such as a wing cover. Alternatively the spar may further comprise a spar cap which is integrally formed as a single piece with the spar web and extends along a substantial length of the spar. Such a flange can be used to attach the spar to a cover or other part. Typically the depth of the integrally formed part of the container measured in a direction normal to the spar web is between 70% and 300% of the depth of the spar cap immediately adjacent to the container in a direction normal to the spar web. The track container is thus sufficiently deep to house at least part of a system component such as a flap track, whilst being sufficiently shallow to be relatively easy to form integrally with the spar web.

A further aspect of the invention provides a spar for an aircraft, the spar comprising a spar web; a hole in the spar web; and a container flange which extends from the spar web, surrounds the hole in the spar web and is integrally formed as a single piece with the spar web.

Integrally forming the spar web and the container flange as a single piece enables the spar web to be relatively shallow because it is no longer necessary to provide relatively flat sections of spar web around the container flange to accommodate a flange at the base of the container.

The spar may consist of a web only (without spar caps), or it may be formed integrally with another part such as a wing cover. Alternatively the spar may further comprise a spar cap which is integrally formed as a single piece with the spar web and extends along a substantial length of the spar. Such a flange can be used to attach the spar to a cover or other part.

BRIEF DESCRIPTION OF THE DRAWINGS

Embodiments of the invention will now be described with reference to the accompanying drawings, in which.

DETAILED DESCRIPTION OF EMBODIMENT(S)

Figure 2:
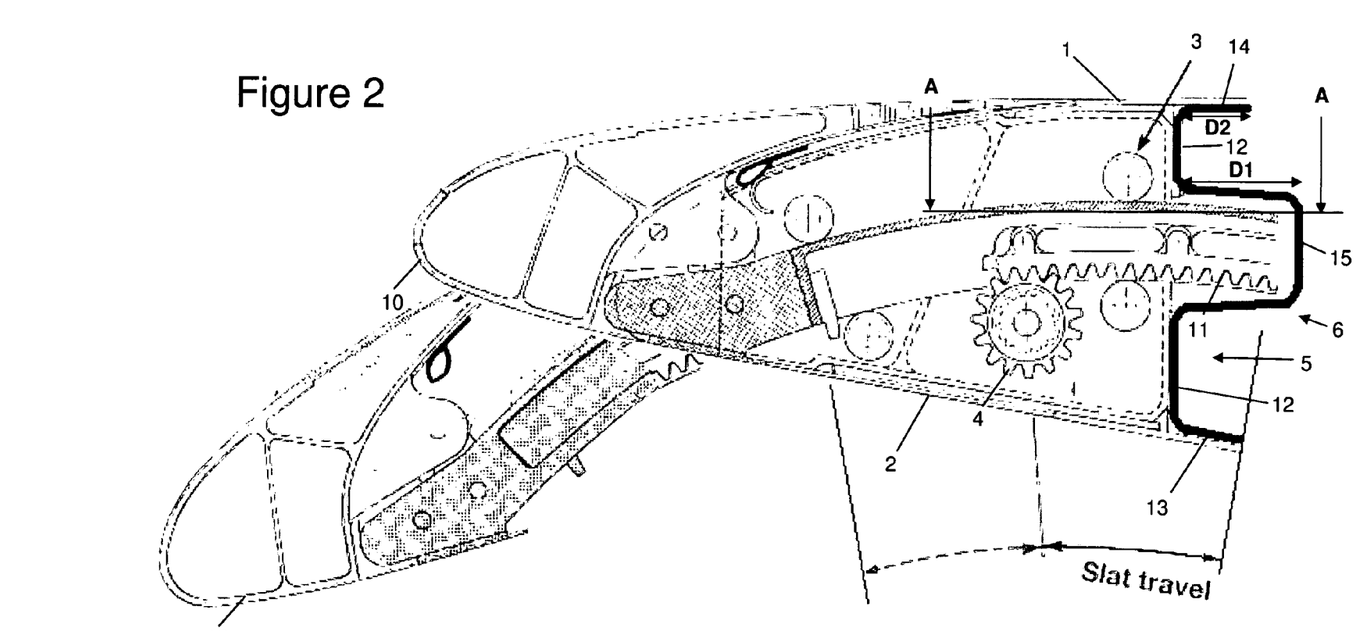
FIG. 2 is a sectional side view of the leading edge of an aircraft wing assembly according to a first embodiment of the present invention.

The leading edge of an aircraft wing assembly is shown in FIG. 2. The wing has an upper cover 1; a lower cover 2 and a front spar 5 extending between them. A fuel tank is located behind the front spar. A slat track 11 carrying a slat 10 is driven by a pinion gear 4 along a curved path defined by a set of rollers 3 between a retracted low-lift cruise position, an intermediate take-off and climb position, and a fully extended high-lift landing position. FIG. 2 shows the slat in both extreme ends of its movement. As the slat track 11 moves, its rear end slides in and out of a slat track container 6 in the front spar 5.

Note that FIG. 2 is a schematic view only, illustrated as a variation on the conventional assembly of FIG. 1. Development in aircraft wing high lift devices are such that, from a slat configuration point of view, required sufficient aerodynamic performance can be achieved with reduced slat travel. Thus the slat track 11 (and its associated travel) has been truncated in FIG. 2 so that it is shorter than the relatively long slat track 8 (and associated travel) shown in FIG. 1. Also the conventional C-section spar 17 has been replaced by a modified spar 5 with a track container 6 which is integrally formed as a single piece with the spar web 12.

Figure 3:
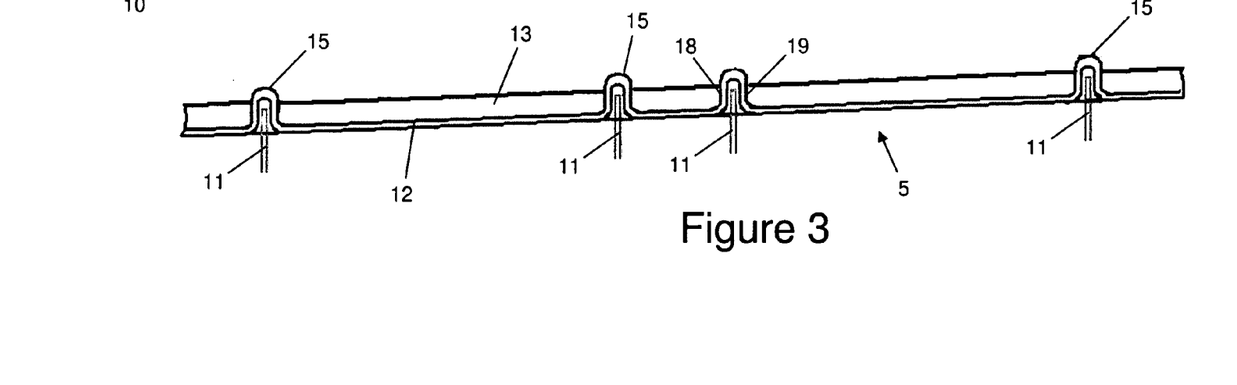
FIG. 3 is a sectional plan view taken along a line A-A in FIG. 2.

The spar comprises a web 12 which extends vertically between the upper and lower covers and a pair of spar caps 13, 14 which extend aft from the web in a chord-wise direction to form a C-section profile. The spar caps 13, 14 are each bolted, bonded, co-bonded or co-cured to a respective one of the covers 1, 2. As shown in FIG. 3, the length of the spar web 12 extends in a span-wise direction and the spar caps 13, 14 extend along a substantial length of the spar. The web 12 is integrally formed with a series of undulations, each forming a respective track container 6. FIG. 3 shows a portion of the length of the spar which includes four track containers 6 and associated tracks 11, but the spar may have as many as twenty or more in total.

Each track container 6 forms a recess on the forward (air) side of the web which houses the aft end of the track 11 when it is in its retracted low-lift position and a protrusion on the aft (fuel) side of the spar which protrudes into the fuel tank.

In the example of FIG. 2 the depth D1 of the track container 6 measured in a direction normal to the spar web is about 200% of the depth D2 of the upper spar cap immediately adjacent to the track container in a direction normal to the spar web. The depth D1 may increase beyond that shown, but manufacturing constraints mean that the depth D1 is preferably no more than 300% of D2.

Each track container 6 has upper and lower walls shown in FIG. 2 which are spaced apart from each other across the spar web in a thickness (vertical) direction and each separated from the spar caps by portions of spar web 12. Each track container also has inboard and outboard side walls 18, 19 which are spaced apart from each other along the spar web in a span-wise direction as shown in FIG. 3, and an end wall 15 shown in both FIGS. 2 and 3.

As shown in FIG. 3, the inner and outer surfaces of the inboard and outboard walls 18, 19 extend at an angle of approximately 90° from the spar web. Alternatively the walls 18, 19 may converge towards each other (in which case the outer surfaces of the walls 18, 19 will extend at an angle greater than 90° from the spar web) or diverge away from each other (in which case the outer surfaces of the walls 18, 19 will extend at an angle less than 90° from the spar web). However in order to minimise the weight and span-wise width of the track container it is preferable that the angle is as close to 90° as possible.

Figure 4:
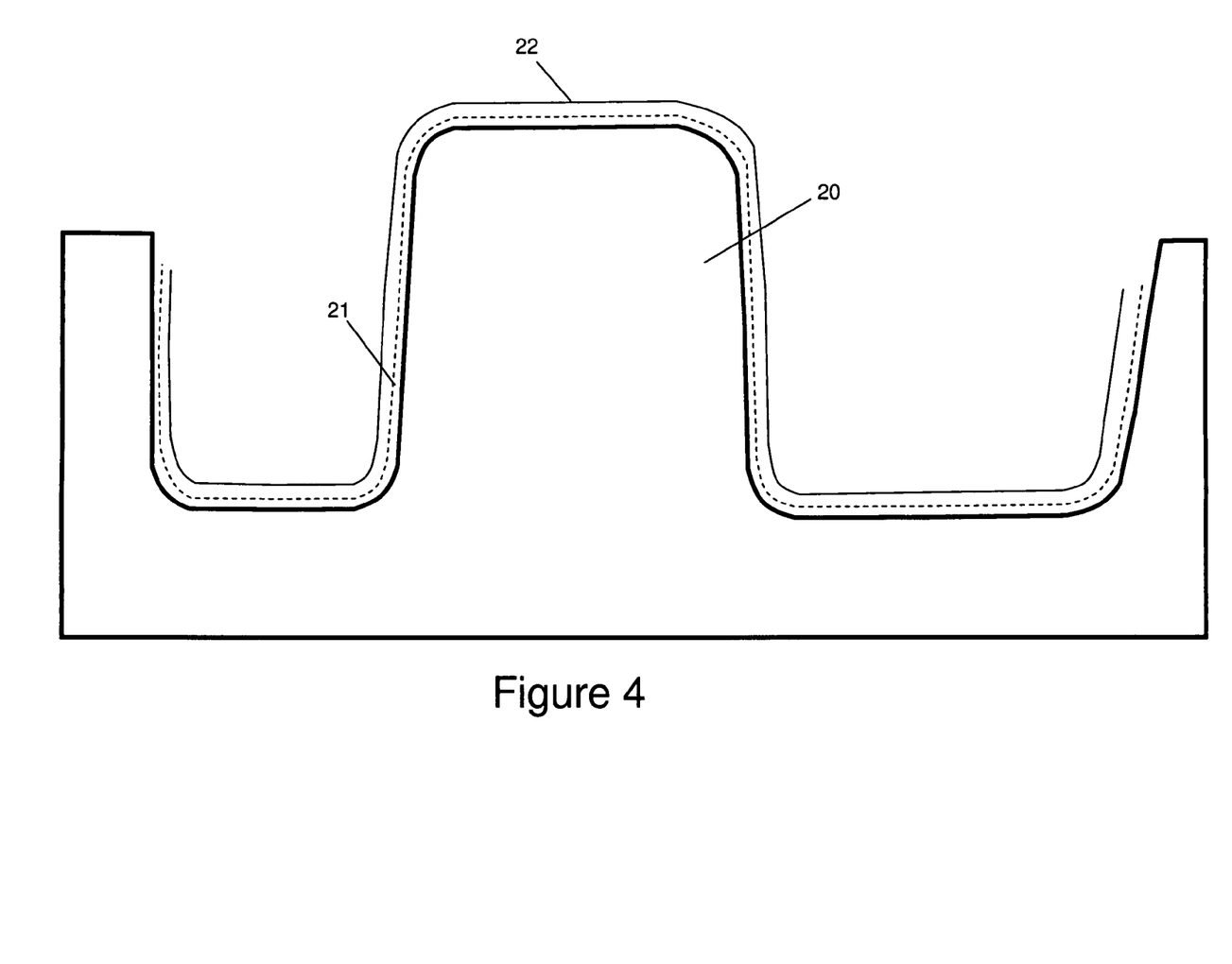
FIG. 4 is a transverse sectional view showing a pair of plies being laid onto a mould tool.
Figure 5:
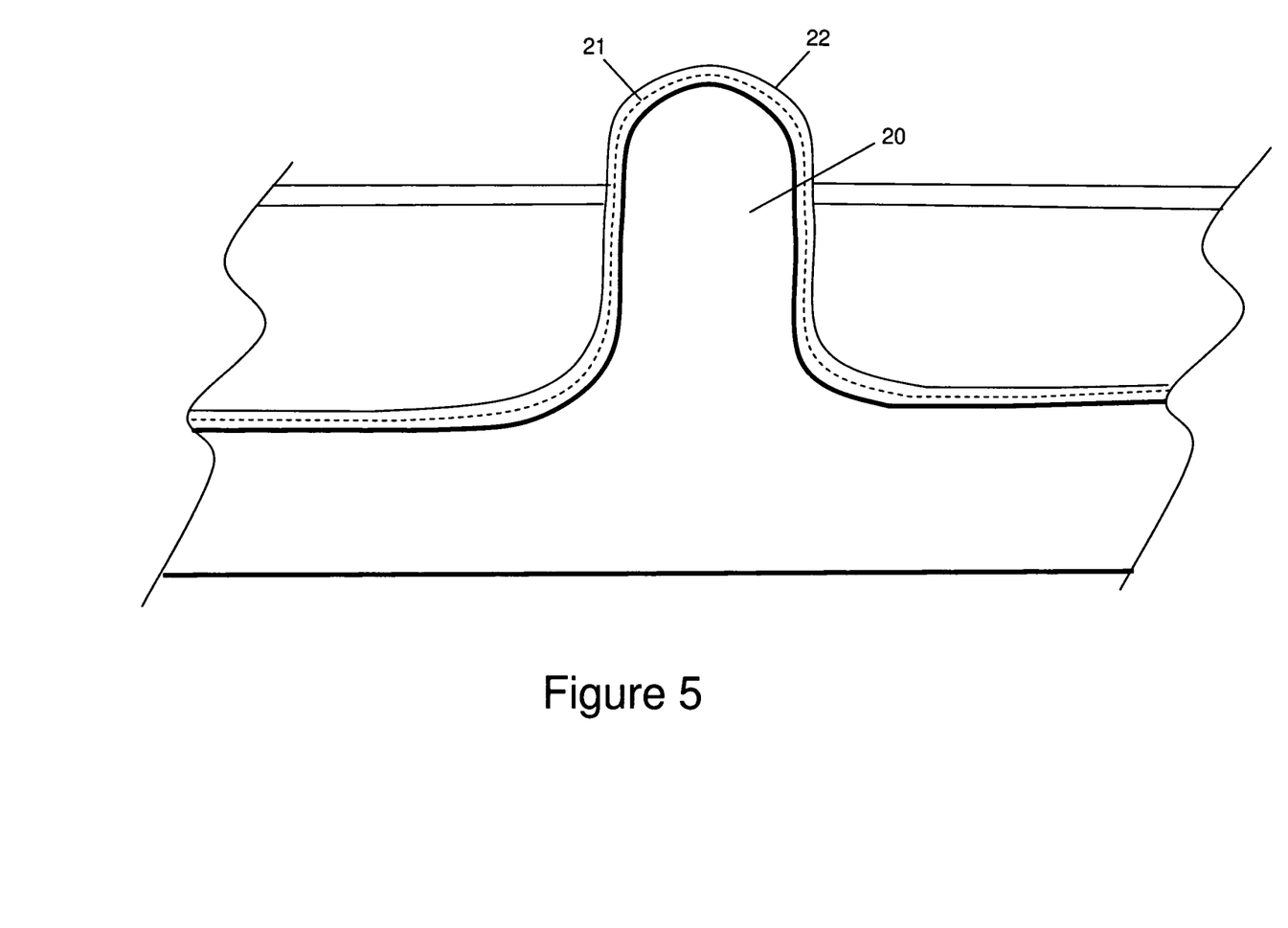
FIG. 5 is a longitudinal sectional view showing the pair of plies being laid onto the mould tool.
Figure 6:
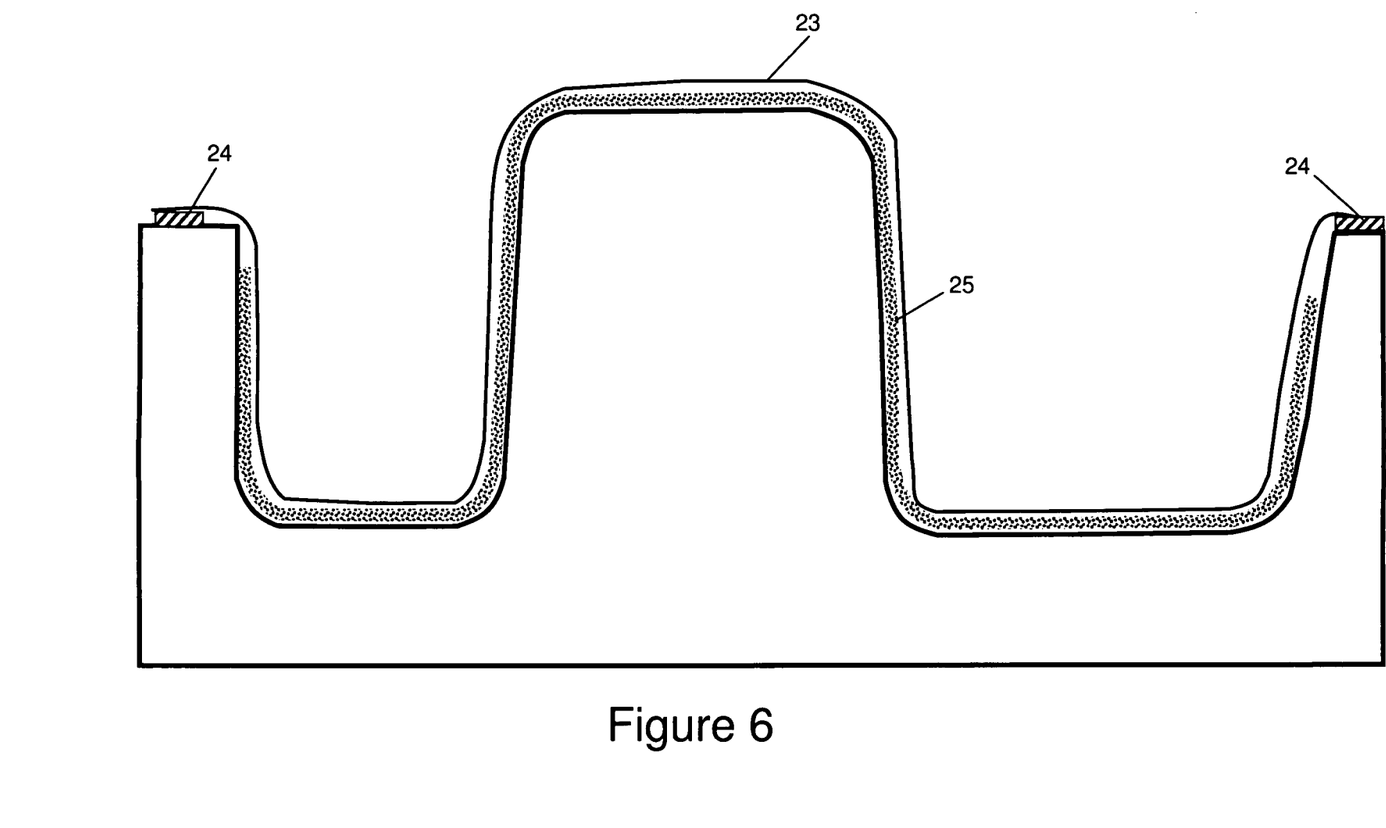
FIG. 6 is a transverse sectional view showing a vacuum bag laid onto a stack of uncured plies.

FIGS. 4-6 illustrate a method of manufacturing the spar 5. A stack of plies of composite material is laid onto a mould tool 20. Each ply of composite material comprises a series of unidirectional carbon fibres impregnated with an epoxy resin, known as a "prepreg". The plies may be laid onto the mould tool by hand, or by an automated process such as fibre placement or automated tape laying. The plies are laid onto the tool with the carbon fibres running in different directions, according to a desired stacking sequence. By way of example, FIGS. 4 and 5 show a first ply 21 with the carbon fibres running along the spar in a span-wise direction (these are conventionally referred to as 0° plies) and a second ply 22 with the carbon fibres running across the spar at right angles to the 0° plies (these are conventionally referred to as 90° plies). The thickness of the spar is shown to be constant in the drawings, but optionally the thickness may be varied by cutting or adding plies to the stack in selected areas. However in general it is to be expected that most or all prepreg plies in the stack will extend continuously from the spar web and into the track container 6.

When the stack has been assembled, a vacuum bag 23 (along with various breather layers and consumables not shown) is laid onto the stack and sealed at its edges by tape 24. Then the region between the vacuum bag and the mould tool is evacuated and the stack of plies is moulded by a combination of heat and pressure to form the spar web, caps and track containers. The spar's temperature is then elevated further to cure it in its moulded shape.

Figure 7:
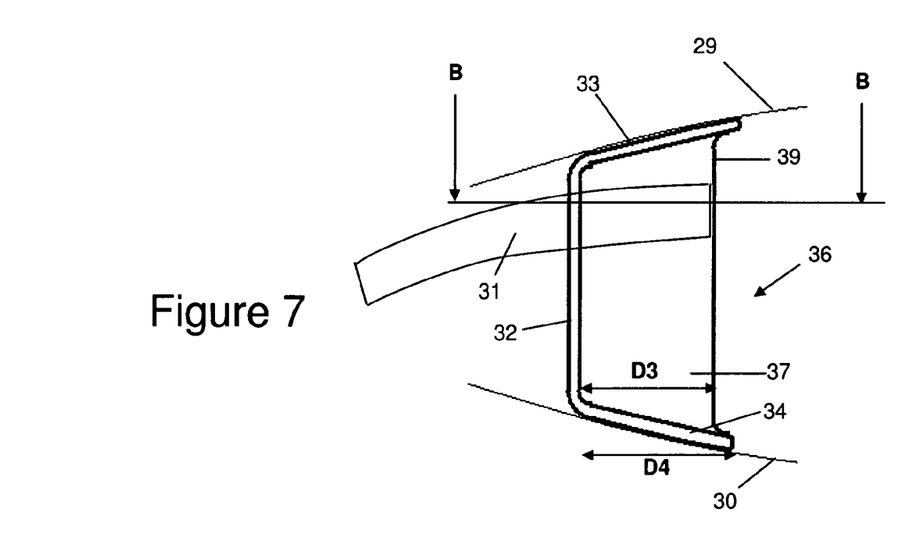
FIG. 7 is a sectional side view of the leading edge of an aircraft wing assembly according to a second embodiment of the present invention.

The leading edge of an aircraft wing assembly according to a further embodiment of the invention is shown in FIG. 7. The wing has an upper cover 29; a lower cover 30 and a front spar extending between them. A fuel tank is located behind the front spar. A slat track 31 carrying a slat (not shown) is driven between a retracted low-lift cruise position shown in FIG. 7, an intermediate take-off and climb position, and a fully extended high-lift landing position. As the slat track 31 moves, it slides in and out of a slat track container 36 in the front spar.

Note that FIG. 7 is a schematic view only, and omits various details shown in FIGS. 1 and 2.

The spar comprises a web 32 which extends in a span-wise direction and a pair of spar caps 33, 34 which extend aft from the web in a chord-wise direction to form a C-section profile. The web is integrally formed with a number of track containers 36. FIG. 7 shows a portion of the length of the spar which includes four track containers and associated tracks, but the spar may have as many as twenty or more in total.

Each track container 36 forms a recess on the forward (air) side of the web which houses the aft end of the track 31 when it is in its retracted low-lift position and a protrusion on the aft (fuel) side of the spar which protrudes into the fuel tank. In the example of FIG. 7 the depth D3 of the track container 36 measured in a direction normal to the spar web is about 80% of the depth D4 of the lower spar cap immediately adjacent to the track container in a direction normal to the spar web. For the outboard track containers this ratio is closer to 100%. The depth D3 may increase beyond that shown, but manufacturing constraints mean that the depth D3 is preferably no more than 300% of D4.

In contrast with the cup-like track containers 6 shown in FIGS. 2-6, the walls 37, 38, 39 of the track containers 36 extend vertically fully between the upper and lower spar caps, so that the spar caps 33, 34 form the upper and lower walls of the track containers. However the span-wise width of the containers 36 is similar to that of the cup-like containers 6.

The vertically extending walls 37, 38, 39 react shear load and fuel pressure loads within the spar web. Also, wing box ribs can be attached to the walls 37, 38 and/or the end walls 39. It is also expected that this variation would help to reduce the subsequent shearing of the composite fabric during the laying up process (less cutting) compared to the cup concept of FIG. 1, due to the greater fibre continuity which can be achieved.

Figure 8:
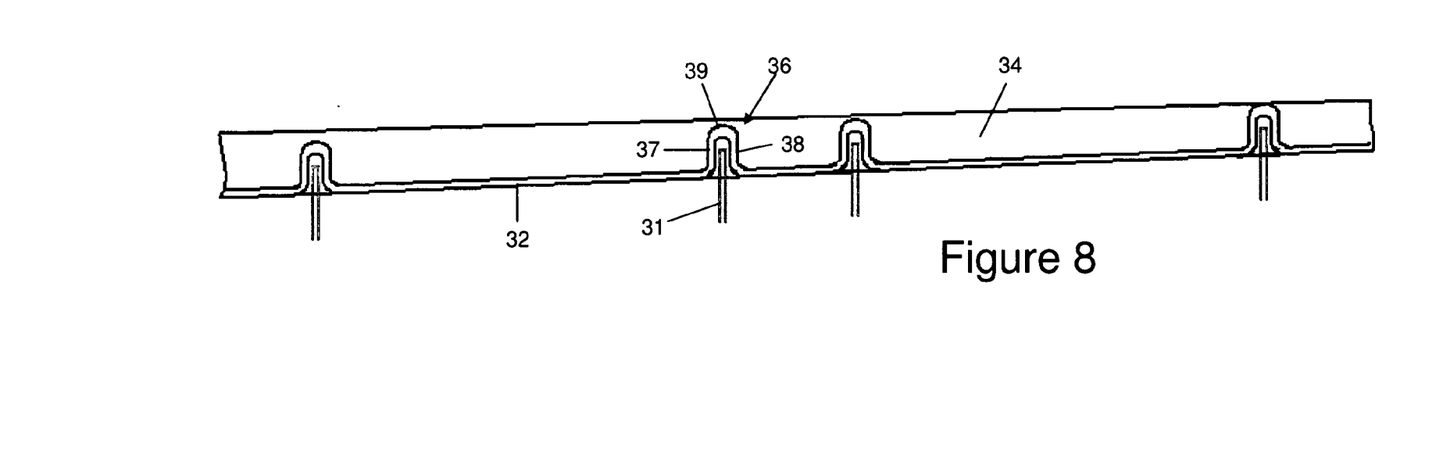
FIG. 8 is a sectional plan view taken along a line B-B in FIG. 7.

As shown in FIG. 8, the inboard (outer) and outboard (inner) surfaces of the inboard wall 37 extend at an angle of approximately 90° from the spar web 32. Similarly the inboard (inner) and outboard (outer) surfaces of the outboard wall 38 extend at an angle of approximately 90° from the spar web 32. Alternatively the walls 37, 38 may converge towards each other (in which case the outer surfaces of the walls 37, 38 will extend at an angle greater than 90° from the spar web) or diverge away from each other (in which case the outer surfaces of the walls 37, 38 will extend at an angle less than 90° from the spar web). However in order to minimise the weight and span-wise width of the track container it is preferable that the angle is as close to 90° as possible.

Figure 9:
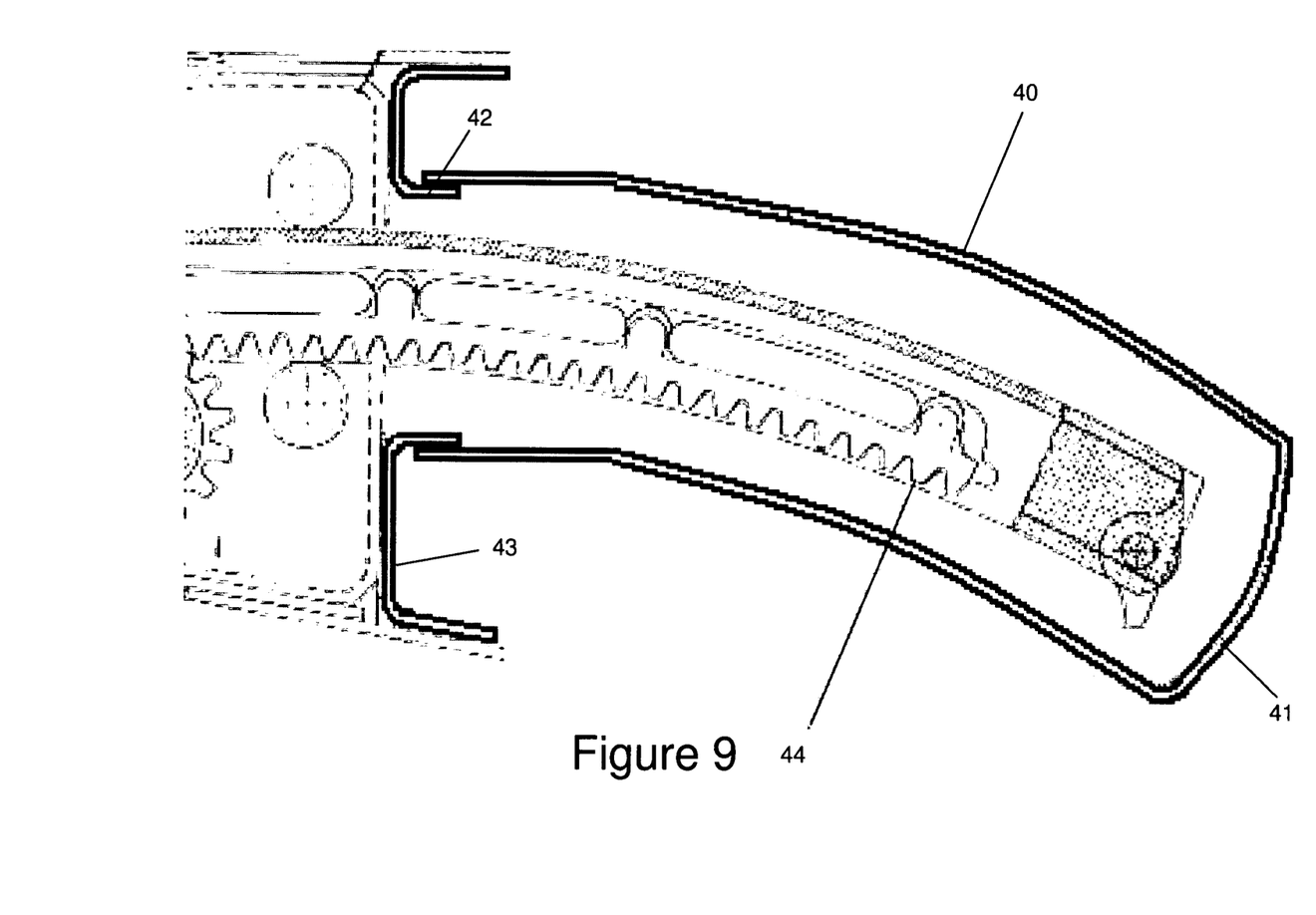
FIG. 9 is a sectional side view of the leading edge of an aircraft wing assembly according to a third embodiment of the present invention.

The leading edge of an aircraft wing assembly according to a further embodiment of the invention is shown in FIG. 9. The slat track 44 has a similar length to the relatively long slat track 8 shown in FIG. 1, so it is not possible in this case to form the entire slat track container integrally with the spar web 43. Instead the track container is formed in two parts: a ring-shaped track container flange 42 which surrounds the hole in the spar web, extends from the spar web 43 into the fuel tank to form the base of the slat track container and is integrally formed as a single piece with the spar web 43; and a track container body 40 which is bonded to the track container flange 42. The track container flange 42 is typically circular although other closed ring shapes are possible such as oval or square.

The spar web 43 and track container flange 42 are formed integrally as a single piece from laminar composite material using a similar process to that shown in FIG. 4-6. The track container body 40 may be formed from the same laminar composite material as the spar web 43 and track container flange 42, or from a different material optimised for the loads acting on the track container. A variety of manufacturing techniques may be used to form the track container body 40, but its tubular shape lends itself to an automated wire winding process in which tows of resin-impregnated fibre are wound onto a rotating mandrel.

The embodiment of FIG. 9 has certain advantages compared with the conventional track can of FIG. 1, namely:
- the need to bolt through the front spar is avoided and hence the issues associated with such an activity are avoided - that is, weakening of the spar web as a result of stress concentrations from holes and discontinuity of fibres, and the time and cost of drilling operations
- by forming the flange in the spar web instead of the track container, the area of 'flat' spar web required to attach the track container body 40 is reduced, thus opening greater opportunities in leading edge wing component integration
- by forming the flange in the spar web instead of the track container, the geometry of the track container body 40 is simplified, thus opening the opportunity to automated manufacturing processes utilising composite materials (wire wound pressure vessel using a mandrel), which can save manufacturing costs, improve component repeatability (quality) and reduce component weight.

Although the invention has been described above with reference to one or more preferred embodiments, it will be appreciated that various changes or modifications may be made without departing from the scope of the invention as defined in the appended claims.

For instance the embodiments described above relate to a slat track container on the leading edge of a wing, but similar principals can be applied in producing a flap track container for containing a flap track on the trailing edge of the wing.

The invention claimed is:

1. An aircraft wing assembly, said assembly comprising:
a pair of covers;
a spar web extending between the covers in a thickness direction, the spar web having a length which extends in a span-wise direction and separating a fuel tank space from a non-fuel space; and
a container which extends into said fuel tank space from the spar web and is configured to house at least part of a moveable leading edge slat track, wherein the container comprises:
a container flange integrally formed as a single piece with said spar web and extending into said fuel tank space; and
a container body joined to said container flange and extending into said fuel tank space and enclosing said at least part of a moveable leading edge slat track.

2. The assembly of claim 1 wherein the spar web and the container flange are integrally formed from a laminar composite material.

3. The assembly of claim 2 wherein at least one ply of the laminar composite material extends continuously from the spar web and into the container.

4. The assembly of claim 1 wherein the spar web and the container flange are integrally formed as a single piece by moulding.

5. The assembly of claim 1 wherein the container comprises first and second side walls which are spaced apart from each other across the spar web in the thickness direction, and inboard and outboard walls which are spaced apart from each other along the spar web in the span-wise direction, wherein the first side wall comprises a first spar cap which is integrally formed as a single piece with the spar web and joined to a first one of the covers; wherein the second side wall comprises a second spar cap which is integrally formed as a single piece with the spar web and joined to a second one of the covers, and wherein the inboard and outboard walls extend fully between the spar caps.

6. The assembly of claim 1 wherein the container body is bonded to the container flange.

7. The assembly of claim 1 further comprising an actuation mechanism for moving the leading edge slat between an extended high-lift position and a retracted low-lift position, wherein the container houses at least part of the slat track when it is in said retracted low-lift position.

8. A method of manufacturing an aircraft wing assembly including a moveable leading edge slat, the method comprising:
laying up a stack of plies of composite material;
moulding the stack of plies by a combination of heat and pressure to form a spar with a spar web, said web including a hole in said web to accommodate movement of a slat track, said moulding step including the moulding of a container flange around said hole;
curing the spar in said moulded shape; and
joining a container body to said container flange for housing at least part of said slat track in the container body.

9. The aircraft wing assembly of claim 5, wherein the inboard and outboard walls are spaced apart along the length of the spar web in the span-wise direction and extend at an angle from the spar web, and the angle is between 50° and 130°.

10. The aircraft wing assembly of claim 9 wherein the angle is between 70° and 110°.

11. A spar for an aircraft wing assembly, said wing assembly including a moveable leading edge slat, the spar comprising:
a spar web extending in a thickness direction for said wing assembly and separating a fuel tank space from a non-fuel space;
a hole in the spar web; and
a container flange extending from the spar web into said fuel tank space, and surrounding the hole in the spar web, said flange is integrally formed as a single piece with the spar web, said flange configured to join a container body extending into said fuel tank space, said container body enclosing a slat track for said moveable leading edge slat.

12. An aircraft wing assembly, said assembly comprising:
a pair of covers;
a spar web having a first section extending between the covers in a thickness direction, the first section of the spar web having a length which extends in a span-wise direction and separating a fuel tank space from a non-fuel space, the spar web having a second section extending in a chord-wise direction at an angle to the first section of the spar web and into said fuel tank space, the second section of the spar web comprising a container flange; and
a container body joined to said container flange and extending into said fuel tank space to enclose at least part of a moveable leading edge slat track.

13. The assembly of claim 12 wherein the spar web and the container flange are formed as a single piece from a laminar composite material.

14. The assembly of claim 12 wherein the first section of the spar web and the container flange are formed as a single piece by moulding.

15. The assembly of claim 12 wherein the container body is bonded to the container flange.

16. The assembly of claim 12 further comprising an actuation mechanism for moving the leading edge slat between an extended high-lift position and a retracted low-lift position, wherein the container body houses at least part of the slat track when it is in said retracted low-lift position.

\* \* \* \* \*